(12) United States Patent
Banerjee et al.

(10) Patent No.: US 7,478,169 B2
(45) Date of Patent: Jan. 13, 2009

(54) ACCESSING DATA PROCESSING SYSTEMS BEHIND A NAT ENABLED NETWORK

(75) Inventors: Dwip N. Banerjee, Austin, TX (US);
Vinit Jain, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 10/687,266

(22) Filed: Oct. 16, 2003

(65) Prior Publication Data

US 2005/0086373 A1    Apr. 21, 2005

(51) Int. Cl.
*G06F 15/16* (2006.01)
*G06F 9/00* (2006.01)

(52) U.S. Cl. .......................... 709/245; 726/12
(58) Field of Classification Search ............. 726/11–12; 709/229, 225, 239, 227, 217, 223, 224, 238, 709/242, 245, 249, 203; 370/401
See application file for complete search history.

(56) References Cited

U.S. PATENT DOCUMENTS

| | | | |
|---|---|---|---|
| 6,493,765 B1 * | 12/2002 | Cunningham et al. | 709/245 |
| 6,865,613 B1 * | 3/2005 | Millet et al. | 709/245 |
| 6,925,076 B1 * | 8/2005 | Dalgic et al. | 370/356 |
| 6,944,167 B1 * | 9/2005 | McPherson | 370/401 |
| 6,970,944 B2 * | 11/2005 | Johnson et al. | 709/238 |
| 7,099,957 B2 * | 8/2006 | Cheline et al. | 709/245 |
| 7,257,643 B2 * | 8/2007 | Mathew et al. | 709/238 |
| 7,293,077 B1 * | 11/2007 | Teo et al. | 709/221 |
| 7,313,632 B2 * | 12/2007 | Hwang | 709/245 |
| 2001/0005861 A1 * | 6/2001 | Mousseau et al. | 709/245 |

(Continued)

FOREIGN PATENT DOCUMENTS

WO   WO 01/59966 A1   8/2001   .................. 370/466

OTHER PUBLICATIONS http://web.archive.org/web/20020102131755/http://www.scit.wlv.ac.uk/cgi-bin/mansec?4+resolv.conf Vixie, Paul, et al Wayback machine accessed on Jun. 25, 2007 and archived in 2002 First page, first three paragraphs.*

(Continued)

*Primary Examiner*—J. Bret Dennison
(74) *Attorney, Agent, or Firm*—Matthew W. Baca; Amy J. Pattillo

(57) ABSTRACT

A NAT data processing system is located behind a NAT enabled network with a NAT device as a gateway to the NAT enabled network. A client system located outside the NAT enabled network queries the NAT device for the address of the NAT data processing system located behind the NAT enabled network. The query is automatically routed through the NAT device to a DNS server. The DNS server returns an address for the NAT data processing system and source routing for the NAT device. The NAT device forwards the address and source routing to the client system. The client system sends packets to the NAT data processing system at the address with source routing through the NAT device, such that the NAT data processing system behind the NAT enabled network is directly accessed by the client system from outside the NAT enabled network.

3 Claims, 7 Drawing Sheets

U.S. PATENT DOCUMENTS

| | | | |
|---|---|---|---|
| 2002/0049859 A1 | 4/2002 | Bruckert et al. | 709/246 |
| 2002/0085561 A1 | 7/2002 | Choi et al. | 370/392 |
| 2002/0129165 A1 | 9/2002 | Dingsor et al. | 709/246 |
| 2002/0138622 A1* | 9/2002 | Dorenbosch et al. | 709/227 |
| 2003/0005078 A1* | 1/2003 | Turicchi et al. | 709/217 |
| 2003/0041136 A1* | 2/2003 | Cheline et al. | 709/223 |
| 2003/0154306 A1* | 8/2003 | Perry | 709/245 |
| 2003/0172170 A1* | 9/2003 | Johnson et al. | 709/230 |
| 2004/0044778 A1* | 3/2004 | Alkhatib et al. | 709/228 |
| 2004/0139227 A1* | 7/2004 | Takeda | 709/245 |
| 2004/0249974 A1* | 12/2004 | Alkhatib et al. | 709/245 |
| 2005/0086373 A1* | 4/2005 | Banerjee et al. | 709/245 |
| 2005/0235044 A1* | 10/2005 | Tazuma | 709/217 |

OTHER PUBLICATIONS

Internet Draft: Resolver Configuration File, accessible on Oct. 13, 2003 from http://www.microsoft.com/technet/treeview/default.asp?url=/technet/prodtechnol/windowsserver2003/proddocs/standard/sag_dns_und_howdnsworks.asp.

Internet Draft: Configuration file for name server routinces, accessible on Oct. 13, 2003 from http://mirrors.ccs.neu.edu/cgi-bin/unixhelp/man-cgi?resolv.conf+4.

Internet Draft: How Network Address Translation Works, accessible on Oct. 13, 2003 from http://computer.howstuffworks.com/nat.htm/printable.

Internet Draft: RFC 1631—The IP Network Address Translator, accessible on Oct. 13, 2003 from http://www.faqs.org/rfcs/rfc1631.html.

* cited by examiner

| DNS QUERY 80 | QUESTION<br>(1) MACHINE1.MYDOMAIN.COM<br>(2) ADDRESS (A) RESOURCE RECORD<br>(3) INTERNET (IN) CLASS |
|---|---|

| RESOLV.CONF 82 | DOMAIN      AUSTIN.IBM.COM<br>NAMESERVER   9.3.149.2<br>NAMESERVER   9.53.16.20 |
|---|---|

| DNS RECORD 84 | MACHINE1.MYDOMAIN.COM   IN   A    10.0.3.31<br>MACHINE1.MYDOMAIN.COM   IN   SR   9.53.16.20 |
|---|---|

| DNS RESPONSE 86 | MACHINE1.MYDOMAIN.COM   IN   A    10.0.3.31<br>MACHINE1.MYDOMAIN.COM   IN   SR   9.53.16.20 |
|---|---|

ACCESSING DATA PROCESSING SYSTEMS BEHIND A NAT ENABLED NETWORK

BACKGROUND OF THE INVENTION

1. Technical Field

The present invention relates in general to improved networking and in particular to a method for accessing data processing systems behind a NAT enabled network. Still more particularly, the present invention relates to receiving a source routing address with a DNS query response, such that loose source routing is enabled for accessing data processing systems behind a NAT enabled network from a client system located outside said NAT enabled network.

2. Description of the Related Art

The development of computerized information resources, such as interconnection of computer networks, allows users of data processing systems to link with servers within a network to access vast amounts of electronic information. Multiple types of computer networks have been developed that provide different types of security and access and operate at different speeds. For example, the internet, also referred to as an "internetwork", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite of protocols.

For a computer to communicate with other computers and servers on the Internet, it must have an Internet Protocol (IP) address identifying the location of the computer on the network. Thus, an issue facing the Internet is the depletion of address and scaling in routing that arises with the increase in home and business networks.

Many computers are arranged in a local area network (LAN) or wide area network (WAN) that is a private network used by an individual or business. Computers operating within the private network often have access to the Internet. Thus, an issue facing many individuals and businesses is how to protect data within a local network of computer systems that also have access to the Internet.

Both the addressing and security problems are often solved using a Network Address Translation (NAT) enabled router with a firewall. When NAT is implemented, the individual machines within a private network have unique private addresses rather than unique public IP address. Thus, a single IP address is used by the NAT router and a port mapping scheme is implemented to route packets to data processing systems in the NAT network. As a result, it is simple for a data processing system in the NAT network to contact an outside system via the Internet because all communications take place using the NAT router's IP address. Adding additional security, communications routed to the Internet hide the unique local address of the data processing system in the NAT network. Additionally, a port mapping scheme of the NAT router is implanted to route received packets to specific data processing systems in the NAT network.

While NAT provides solutions to the addressing and protection problems, there are also several disadvantages to NAT. Primarily, while it is easy for machines within the NAT network to contact machines outside the NAT network, the reverse is not true. A user at work may want to access his home machine to download images from the home machine or telnet to the home machine, for example. Current NAT techniques do not allow such access directly to machines within the NAT network. Therefore, it would be advantageous to provide a method, system, and program for accessing data processing systems behind a NAT enabled network. Further, it would be advantageous to provide a method, system, and program for accessing data processing systems behind a NAT enabled network without requiring use of a dedicated port.

SUMMARY OF THE INVENTION

In view of the foregoing, it is therefore an object of the present invention to provide improved network systems.

The present invention provides a method for accessing data processing systems behind a NAT enabled network.

The present invention provides a method for receiving a source routing address with a DNS query response, such that loose source routing is enabled for accessing data processing systems behind a NAT enabled network from a client system located outside said NAT enabled network.

According to one aspect of the present invention, a NAT data processing system is located behind a NAT enabled network with a NAT device as a gateway to the NAT enabled network. A client system located outside the NAT enabled network queries the NAT device for the address of the NAT data processing system located behind the NAT enabled network. The query is automatically routed through the NAT device to a DNS server. The DNS server then returns an address for the NAT data processing system and source routing for the NAT device. The NAT device forwards the address and source routing to the client system. Then, the client system sends packets to the NAT data processing system at the address with source routing through the NAT device, such that the NAT data processing system behind the NAT enabled network is directly accessed by the client system from outside the NAT enabled network.

In querying the NAT device for the address of the NAT data processing system, the client system first receives a user request to establish a connection with a particular domain name, wherein the domain name identifies the NAT data processing system. The client system sends a DNS query of the domain name to the NAT device. In particular, the client system first queries a local DNS server with the domain name of the NAT data processing system. If the local DNS server cannot authoritatively return an address for the domain name, then a resolv.conf file is consulted for another address to try the DNS query. The address of the NAT device is designated in the resolv.conf file, so that when the DNS query is sent to the NAT device address, the DNS query is automatically routed to a DNS server that stores the private address of the NAT data processing system and the source routing for the NAT device.

Multiple data processing systems may be located behind a NAT enabled network that are parallel in the services and data provided. Thus, when a query is sent to the NAT device to resolve the domain name of the NAT data processing system, the DNS query routed through the NAT device may return the addresses of other parallel data processing systems operating behind the NAT enabled network. Thus, if one of the multiple parallel data processing systems is unavailable, the next one can be tried using the returned address of the next parallel data processing system and the source routing for the NAT device.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
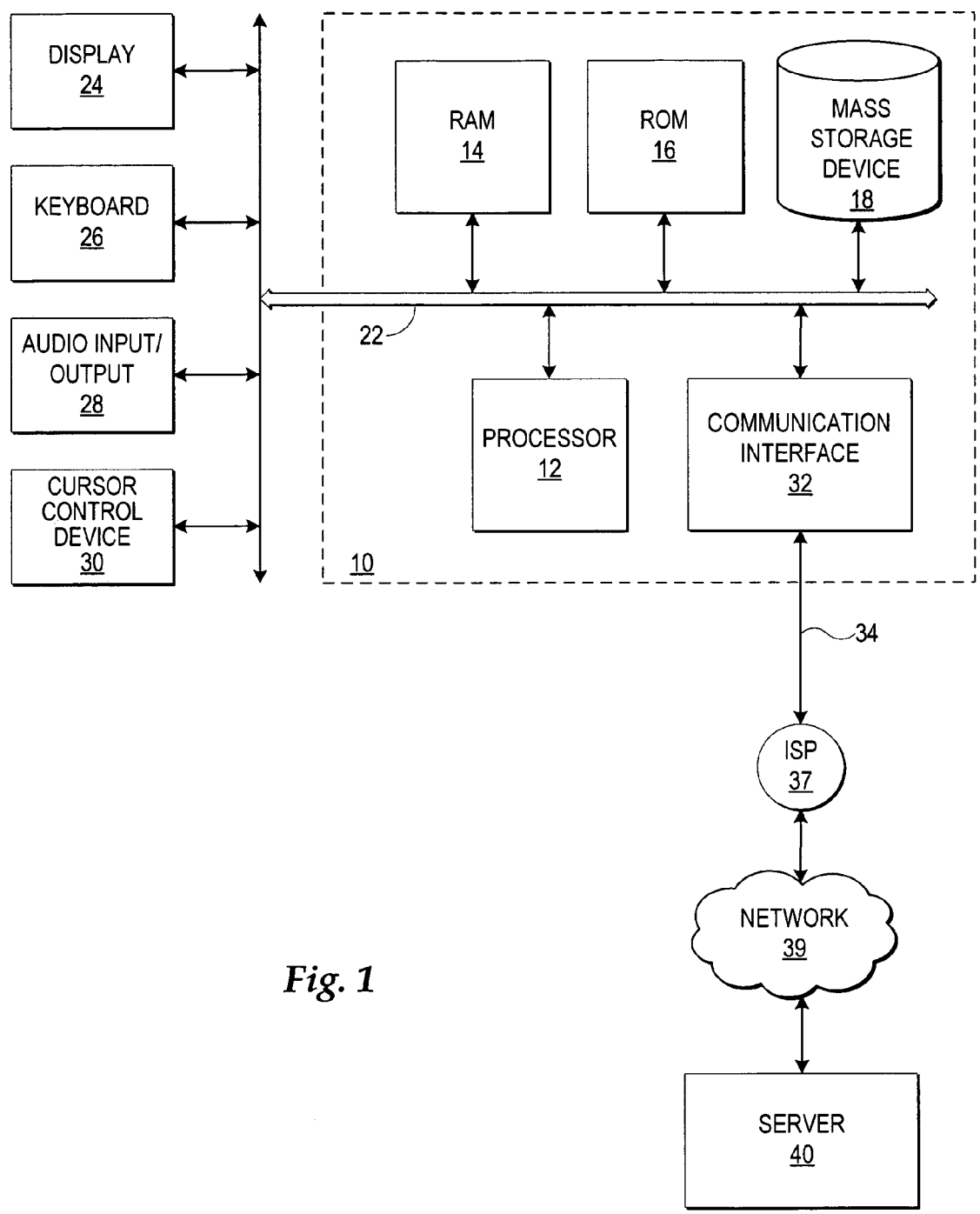
FIG. 1 is a block diagram depicting a computer system in which the present method, system, and program may be implemented.

Referring now to the drawings and in particular to FIG. 1, there is depicted one embodiment of a computer system in which the present method, system, and program may be implemented. The present invention may be executed in a variety of systems, including a variety of computing systems and electronic devices under a number of different operating systems. In general, the present invention is executed in a computer system that performs computing tasks such as manipulating data in storage that is accessible to the computer system. In addition, the computer system includes at least one output device and at least one input device.

Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and adapters and controlled within computer system 10 by multiple bus controllers. When implemented as a server system, computer system 10 typically includes multiple processors designed to improve network servicing power.

Processor 12 may be a general-purpose processor such as IBM's PowerPC™ processor that, during normal operation, processes data under the control of operating system and application software accessible from a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts of FIGS. 6, 7, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18 which as depicted is an internal component of computer system 10, but will be understood to also be provided by an external device. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 40 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through network 39. Network 39 may refer to the worldwide collection of networks and gateways that use a particular protocol, such as Transmission Control Protocol (TCP) and Internet Protocol (IP), to communicate with one another. ISP 37 and network 39 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

When implemented as a server system, including an Internet Domain Name System (DNS), computer system 10 typically includes multiple communication interfaces accessible via multiple peripheral component interconnect (PCI) bus bridges connected to an input/output controller. In this manner, computer system 10 allows connections to multiple network computers.

Further, multiple peripheral components may be added to computer system 10, connected to multiple controllers, adapters, and expansion slots coupled to one of the multiple levels of bus 22. For example, an audio input/output 28 is connectively enabled on bus 22 for controlling audio input through a microphone or other sound or lip motion capturing device and for controlling audio output through a speaker or other audio projection device. A display 24 is also connectively enabled on bus 22 for providing visual, tactile or other graphical representation formats. A keyboard 26 and cursor control device 30, such as a mouse, trackball, or cursor direction keys, are connectively enabled on bus 22 as interfaces for user inputs to computer system 10. In alternate embodiments of the present invention, additional input and output peripheral components may be added.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
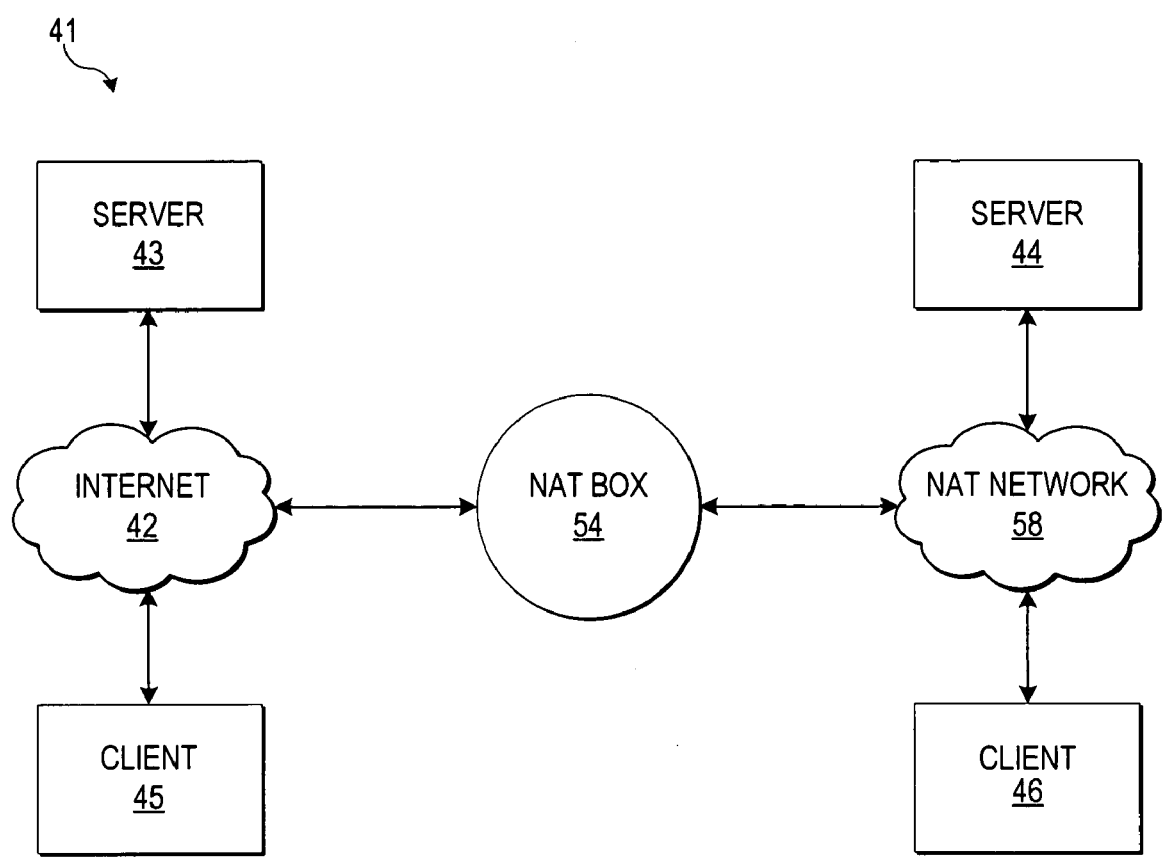
FIG. 2 is a block diagram depicting a distributed network system for facilitating communications between systems in a NAT network and systems in a public network in accordance with the method, system, and program of the present invention.

With reference now to FIG. 2, a block diagram depicts a distributed network system for facilitating communications between systems in a NAT network and systems in a public network in accordance with the method, system, and program of the present invention. Distributed data processing system 41 is a network of computers in which the present invention may be implemented. Distributed data processing system 41 includes a public network, such as Internet 42, and a private network, such as NAT network 58. NAT network 58 may be implemented as a LAN, a WAN, or other private network. Internet 42 and NAT network 58 are the mediums used to provide communications links between various devices and computers connected together within distributed data processing system 41. Internet 42 and NAT network 58 may include permanent connections such as wire or fiber optics cables, temporary connections made through telephone connections and wireless transmission connections.

In the depicted example, server 43 and client 45 are connected to Internet 42. In addition, server 44 and client 46 are connected to NAT network 58. Clients 44 and 45 may be, for example, personal computers or network computers. For purposes of this application, a network computer is any computer coupled to a network, which receives communicates with another computer coupled to the network.

The client/server environment of distributed data processing system 41 is implemented within many network architectures. For example, the architecture of the World Wide Web (the Web) follows a traditional client/server model environment. The terms "client" and "server" are used to refer to a computer's general role as a requester of data (the client) or provider of data (the server). In the Web environment, web browsers such as Netscape Navigator™ typically reside on client systems 45 and 46 and render Web documents (pages) served by a web server, such as servers 43 and 44. Additionally, each of client systems 45 and 46 and servers 43 and 44 may function as both a "client" and a "server" and may be implemented utilizing a computer system such as computer system 10 of FIG. 1. In the examples described for the present invention, client systems 45 and 46 are engaged in peer-to-peer network communications and downloading. In alternate embodiments of the invention, a client-server network communication is also desireable.

NAT can be implemented on multiple devices, such as NAT box 54. NAT box 54 may include a router, a gateway, a firewall, and any other device that sits between NAT network 58 and Internet 42. In NAT network 58, client server 44 and client 46 are assigned private addresses. It is typical for data processing systems operating behind NAT network 58 to be assigned private addresses, that are not necessarily globally unique, starting with a network number 10. NAT box 54 is assigned an IP address that is globally unique.

When client 46 wants to communicate with a data processing system outside NAT network 58, such as server 43, NAT box 54 receives the IP packets and translates the IP source address for client 46 from the private address to the IP address assigned to NAT box 54. When packets come back from a host via Internet 42, NAT box 54 translates the destination address to the private address of client 46 and forwards the packet to the host.

According to an advantage of the present invention, when client 45 wants to communicate directly with server 44 or client 46 within NAT network 58, loose source routing is implemented by client 45. Client 45 receives the private address of server 44 or client 46 and a source routing address for NAT box 54. Client 45 sends packets to server 44 or client 46 at the private address with loose source routing enabled with the source routing address. No additional port mapping configurations are required in NAT box 54 for enabling access to server 44 or client 46.

According to another advantage of the present invention, NAT network 58 may include multiple servers, such as server 44, which provide the same service in NAT network 58. In this case, when client 45 requests communication for the service provided by the multiple servers, client 45 receives the private addresses of each of the parallel servers and the source routing address for NAT box 54. The communication may then be routed by NAT box 54, via loose source routing, to an available server.

Figure 3:
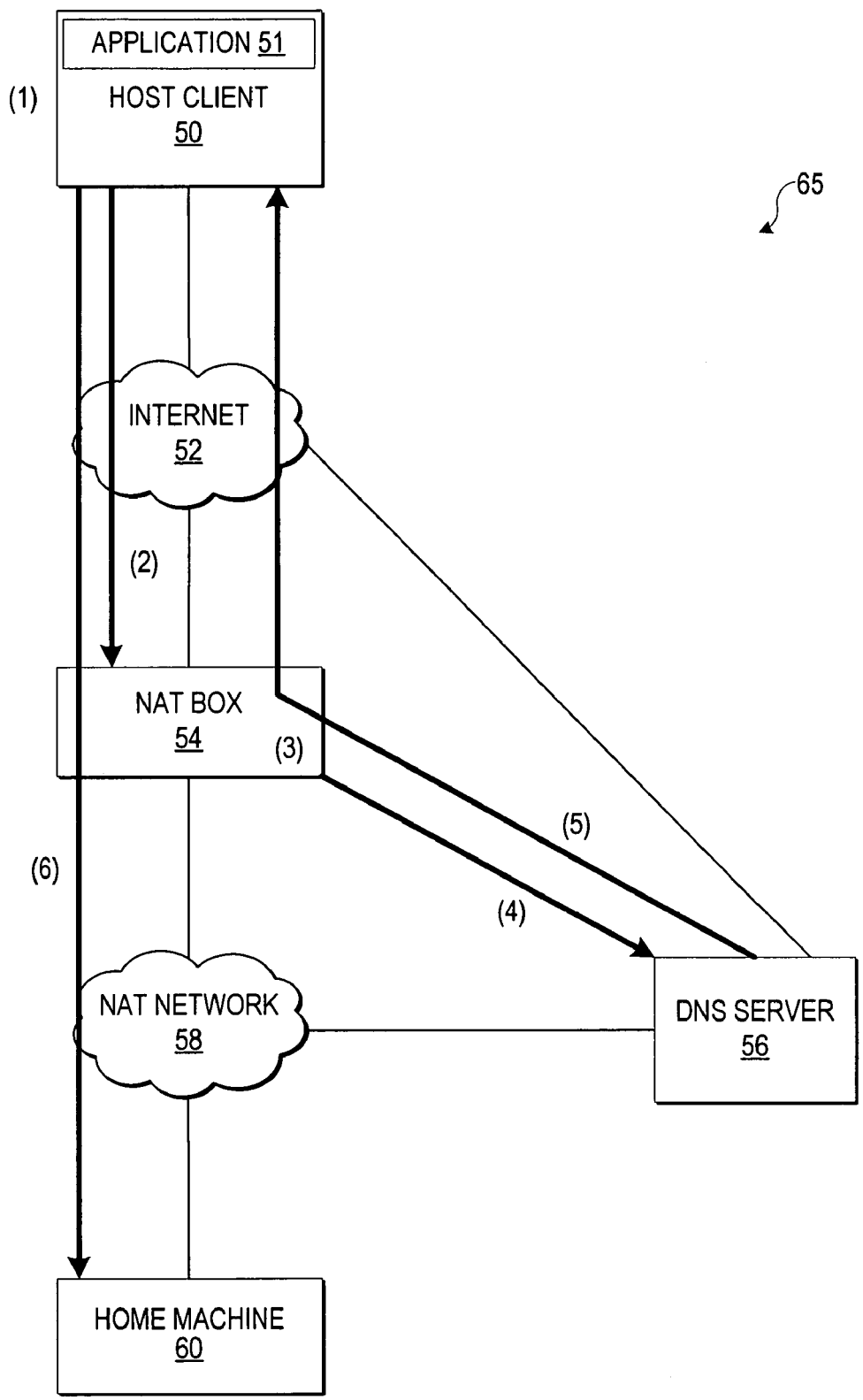
FIG. 3 is a block diagram depicting a distributed network system for accessing a data processing system behind a NAT enabled network in accordance with the method, system, and program of the present invention.

Referring now to FIG. 3, there is depicted a block diagram of a distributed network system for accessing a data processing system behind a NAT enabled network in accordance with the method, system, and program of the present invention. In an example of the present invention, distributed network system 65 includes an application 51 running on host client 50 that requests a connection with the domain name for home machine 60. For example, a user may request to download photos stored on home machine 60 through the application running on host client 50. Home machine 60 is one of multiple data processing systems running behind a NAT enabled network implemented by NAT box 54 and NAT network 58.

NAT box 54, assigned a single IP address, implements NAT. NAT box 54 includes a NAT gateway which implements a port mapping scheme to route packets to the host machines, such as home machine 60 connected to NAT network 58. Additionally, NAT box 54 20 may include a firewall to protect against unauthorized access to home machine 60.

For host client 50 to connect directly with home machine 60, multiple steps are required. In step (1), application 51 requests communication with home machine 60 by the domain name for home machine 60. In step (2), a DNS query is made by host client 50 to obtain the IP address for the domain name. After any required resolver access to resolv-.conf, the DNS query is preferably routed to NAT box 54. In step (3), NAT box 54 receives the query and routes it to a particular port to be forwarded to DNS server 56. In particular, the NAT gateway of NAT box 54 may be set up to forward all queries on a particular port, such as port 53, to DNS server 56. In step (4), the query is forwarded to DNS server 56 for address (A) and source routing (SR) Internet addresses. In step (5), DNS server 56 finds the record for the DNS query and returns A for home machine 60 tagged with SR for NAT box 54. In step (6), host client 50 sends packets to home machine 60 using loose source routing through NAT box 54. However, prior to NAT box 54 allowing access to home machine 60, an additional step may require authorization of the user requesting access to home machine 60. A pre-selected list of authorized users is accessible to NAT box 54. A user at host client 50 may enter a password, voice sample, or other input that enables determination of the identity of the user at host client 50. If the user at host client 50 matches one of the pre-selected user identities, then the user is authorized to access home machine 60.

Figures 4, 5:
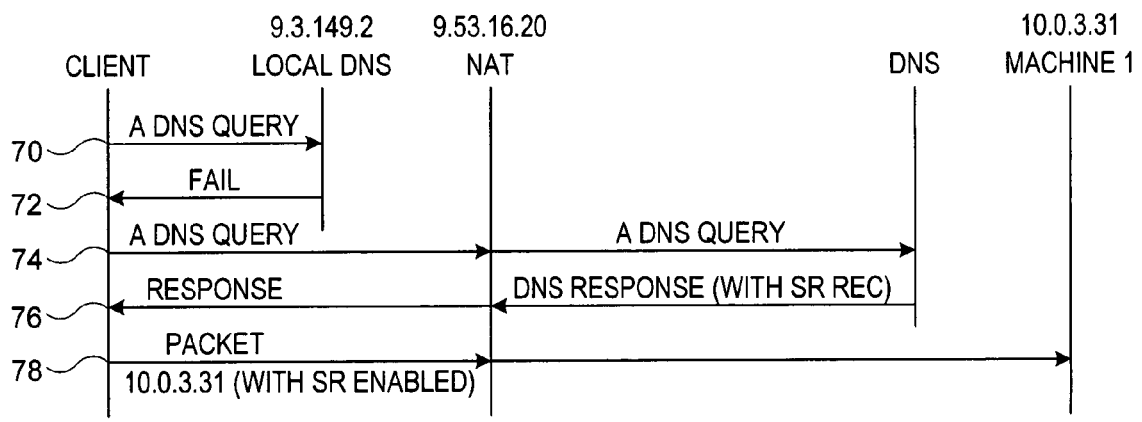
FIG. 4 is a illustrative representation of the data accessed and routed to access a data processing system behind a NAT enabled network in accordance with the method, system, and program of the present invention.
FIG. 5 is a flow diagram depicting the data routed to access a data processing system behind a NAT enabled network in accordance with the method, system, and program of the present invention.

With reference now to FIG. 4, there is depicted an illustrative representation of the data accessed and routed to access a data processing system behind a NAT enabled network in accordance with the method, system, and program of the present invention. For purposes of example, IP addresses used to access a data processing system behind a NAT enabled network are depicted. A DNS query 80 includes a question for the DNS server to answer stated as (1) a fully qualified domain name (FQDN) for the DNS domain name "machine1.mydomain.com"; (2) the query type to find an address (A) resource record; and (3) the Internet (IN) class for the DNS domain name. For a TCP connection, a response to DNS query 80 typically includes the following fields: name, value, type, class, time-to-live (TTL). The name is the domain name. The value is the IP address or other value mapped to the domain name. The type includes how the Value field should be interpreted. For example, Type=A indicates the value is an IP address and Type=SR indicates the value is the source routing address for use with loose source routing. The TTL specifies how long the resource record is valid.

DNS query 80 is sent to a local DNS server. If the local DNS server does know how to return an authoritative DNS for "mydomain.com", then the NAT box's IP address is added, as depicted, as a nameserver entry in resolv.conf 82. Resolv.conf 82 is a configuration file for the DNS client routines "resolver" which is part of a library. In this particular resolv.conf file, for the host client domain "austin.ibm.com", DNS queries are first routed to the local DNS server located at IP address is 9.3.149.2. If the local DNS server is unable to return an authorizative DNS, then the DNS query is next tried at the NAT box located at IP address 9.53.16.20.

When the NAT box receives DNS query 80, the query is automatically forwarded to a particular DNS server that stores the A and SR information for accessing the home machine located at "machine1.mydomain.com". In particular, DNS record 84 illustrates the A and SR information for "machine1.mydomain.com." The A is the IP address for the home machine. The SR is the IP address for the NAT box.

The DNS server returns DNS response 86 with the information included in DNS record 84. In particular, it is advantageous for the DNS server to return a response with both A and SR address so that loose source routing may be implemented to access the home machine.

Referring now to FIG. 5, there is depicted a flow diagram of the data routed to access a data processing system behind a NAT enabled network in accordance with the method, system, and program of the present invention. As illustrated at reference numeral 70, a client system sends an Address (A) DNS query to a local DNS server located at IP address 9.3.149.2. As depicted at reference numeral 72, in the example, the local DNS server is unable to authoritatively return an address for the DNS query and so returns a fail response. After consulting resolv.conf, as illustrated at reference numeral 74, the A DNS query is sent to the NAT box located at IP address 9.53.16.20. The NAT box routes the DNS query to a designated DNS query port and forwards the query to the DNS server enabled to access an IP address for the host machine. As depicted at reference numeral 76, the DNS server responds with the A and SR records. The NAT box forwards the response to the client. The client then sends a packet to the home machine located at IP address 10.0.3.31 with loose source routing enabled. With loose source routing enabled, the NAT box forwards loose source routing packets directly to the home machine. Although not depicted, an additional packet exchange may be required to authenticate the user requesting access to the home machine at multiple points during the process, such as when the DNS query is received at the NAT box or when the packet with loose source routing is received at the NAT box.

Figure 6A:
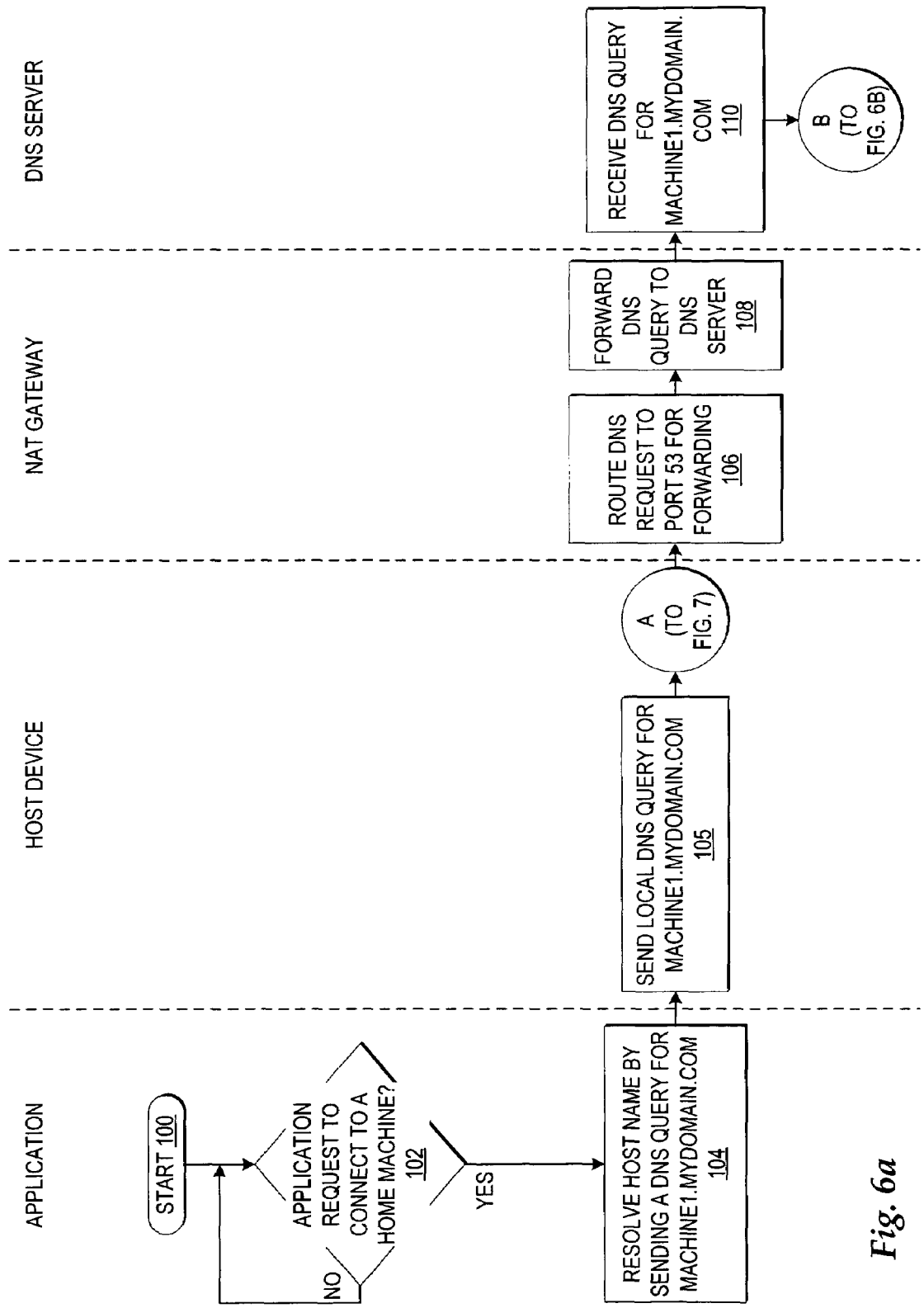
FIGS. 6A-6B depict a high level logic flowchart of a process and program for accessing a data processing system behind a NAT enabled network.
Figure 6B:
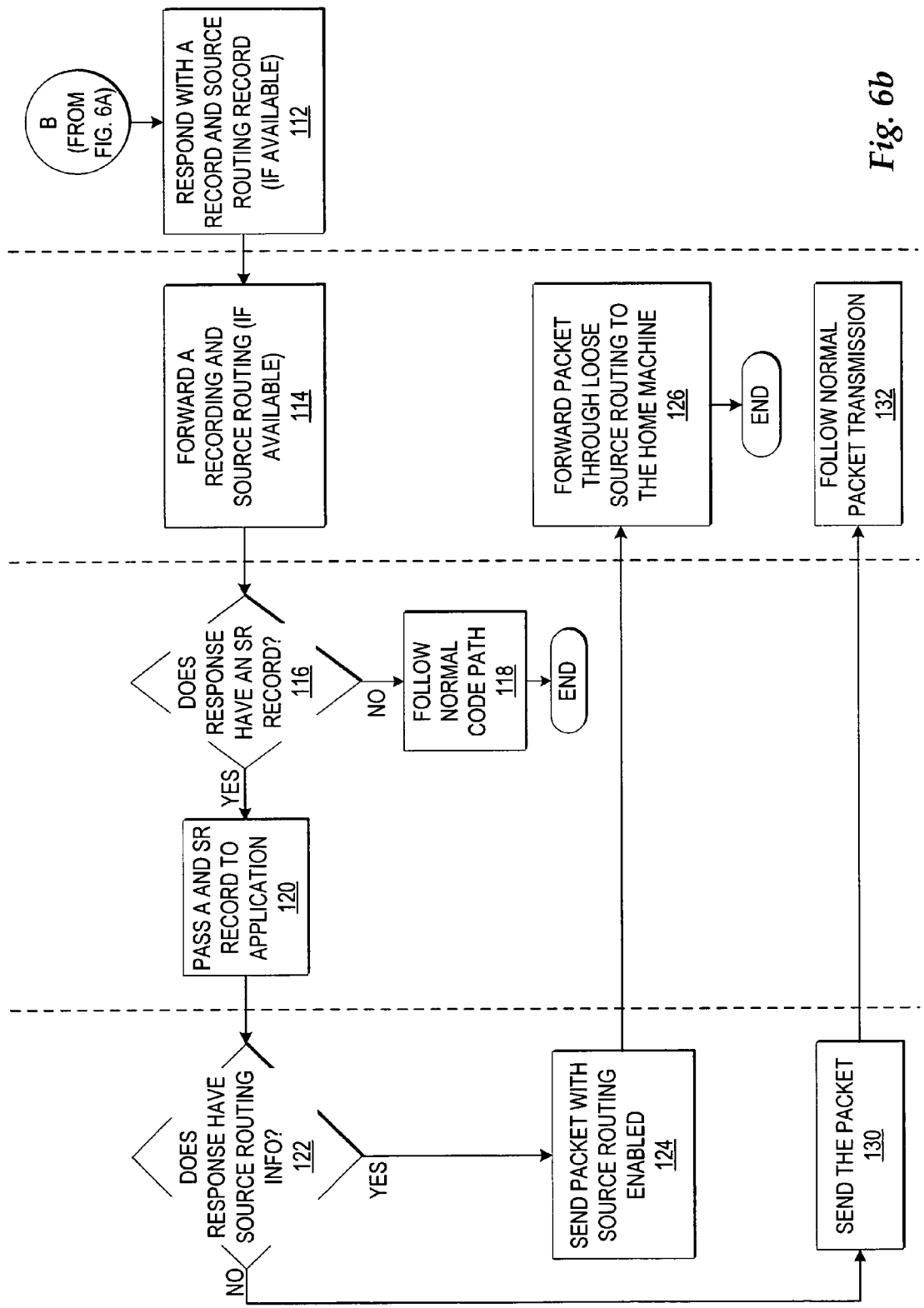

With reference now to FIGS. 6A-6B, there is depicted a high level logic flowchart of a process and program for accessing a data processing system behind a NAT enabled network. As depicted, the process starts at block 100 and thereafter proceeds to block 102. Block 102 depicts a determination whether the application has a request to establish a connection to a home machine. In particular, the request is to access the home machine located at a particular domain name. If the application does not have a request, then the process iterates at block 102. If the application does have a request, then the process passes to block 104. Block 104 illustrates resolving the host name for the request by sending a DNS query, here to "machine1.mydomain.com", and the process passes to block 105.

Block 105 depicts sending the query to the local DNS server for "machine1.mydomain.com". Thereafter, the process passes to process A depicted in FIG. 7. When the process returns from process A depicted in FIG. 7, the process passes to block 106.

Block-106 depicts routing the DNS request to port 53 (or another port for which the NAT box has been enabled for forwarding). Next, block 108 illustrates forwarding the DNS query to a particular DNS server, and the process passes to block 110.

Block 110 depicts receiving a DNS query for "machine1.mydomain.com." Next, block 112 illustrates responding with the A record and the SR record (if available) for "machine1.mydomain.com", and the process passes to block 114. According to one advantage of the present invention, where a home machine is located behind a NAT enabled network, accessing both the A record and the SR record in a DNS query of the home machine domain name will facilitate loose source routing from the client.

Block 114 depicts forwarding the A record and SR record (if available) to the host device, and the process passes to block 116.

Block 116 depicts a determination whether the response has an SR record. If the response does not have an SR record, then the process passes to block 118 where the normal code path is followed and the process ends. If the response does have an SR record, then the process passes to block 120. Block 120 illustrates passing the A and SR records to the application, and the process passes to block 122.

Block 122 depicts a determination whether the response has an SR record. If the response does not have an SR record, then the process passes to block 130 which depicts sending the packet to the A address. If the response does have an SR record, then the process passes to block 124. Block 124 depicts sending the packet with source routing enabled, and the process passes to block 126. In particular, by sending the packet with source routing enabled, loose source routed packets are transferred, as will be understood by one skilled in the art. Block 126 depicts forwarding the packet through loose source routing to the home machine, and the process ends.

Figure 7:
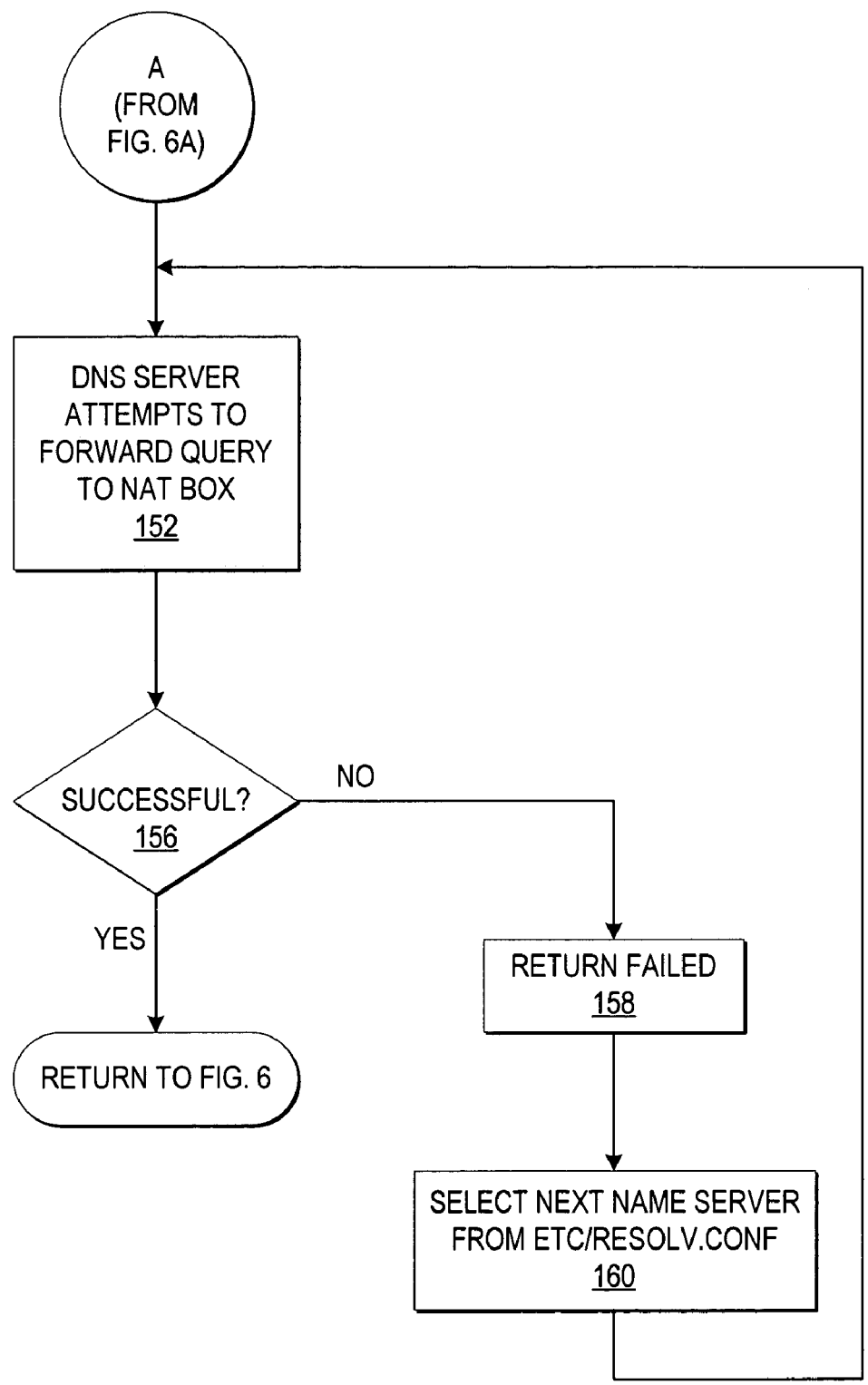
FIG. 7 depicts a high level logic flowchart of a process and program for locating the NAT gateway to then access a data processing system behind a NAT enabled network.

Referring now to FIG. 7, there is depicted a high level logic flowchart of a process and program for locating the NAT gateway to then access a data processing system behind a NAT enabled network. As illustrated, a process A is initiated in the process depicted in FIG. 6. First, block 152 depicts attempting to forward the DNS query to the NAT box. Next, block 156 illustrates a determination whether the forwarding attempt was successful. If the attempt was successful, then the process returns to FIG. 6. If the attempt was not successfully, then the process passes to block 158. Block 158 depicts returning an indicator that the attempt failed. Next, block 160 depicts selecting the next name server from the resolv.conf file, and the process passes to block 152 where the next attempt to forward the query to the NAT box is made to the address identified as the next nameserver.

While the invention has been particularly shown and described with reference to a preferred embodiment, it will be understood by those skilled in the art that various changes in form and detail may be made therein without departing from the spirit and scope of the invention.

What is claimed is:

1. A method for accessing a data processing system behind a network address translation (NAT) enabled network, comprising:

responsive to detecting a user request from a client system to establish a connection with a domain name, wherein said domain name identifies a NAT data processing system located behind said NAT enabled network, sending said request for said domain name to a local domain name service (DNS) server;

responsive to said local DNS server returning a fail response indicating no authoritative address for said domain name, identifying an IP address for a NAT device associated with said requested domain name from a configuration file for a host client domain for said client system;

sending a DNS query of said domain name to said NAT device at said IP address for said NAT device;

automatically routing said query through said NAT device to a second DNS server that stores a plurality of private addresses for a plurality of systems located behind said NAT enabled network and source routing address for said NAT device;

responsive to receiving said query for said address of said NAT data processing system at said DNS server, returning from said DNS server to said client system said plurality of private addresses comprising a private address for said NAT data processing system and additional separate private addresses of a plurality of parallel data processing systems providing a same service as said NAT data processing system located behind said NAT enabled network and said source routing address for said NAT device;

sending packets, from said client system to said NAT data processing system at a particular address associated with said NAT data processing system from among said plurality of private addresses with loose source routing enabled through said NAT device at said source routing address, such that said NAT data processing system behind said NAT enabled network is directly accessed by said client system from outside said NAT enabled network; and responsive to said client system receiving a fail signal from an attempt to send packets to said NAT data processing system, sending packets from said client system to a next data processing system from among said plurality of parallel data processing systems at one of said plurality of private addresses with loose source routing enabled through said NAT device at said source routing address.

2. The method according to claim 1 for accessing a data processing system behind a NAT enabled network wherein automatically routing said query through said NAT device to a DNS server, further comprises:

automatically routing said query through a pre-selected port of said NAT device for handling DNS queries.

3. The method according to claim 1 for accessing a data processing system behind a NAT enabled network further comprising:

authenticating an identity of a user at said client system;

only allowing access to said NAT data processing system if said authenticated identity of said user matches one of a plurality of authenticated users enabled to access systems behind said NAT enabled network.

* * * * *